United States Patent
Lepage et al.

(10) Patent No.: US 10,555,514 B2
(45) Date of Patent: Feb. 11, 2020

(54) FLY FISHING LINE AND METHOD FOR MANUFACTURING SAME

(71) Applicant: SCIENTIFIC ANGLERS LLC, Arlington, VT (US)

(72) Inventors: James B. Lepage, Arlington, VT (US); Joshua Herbert Jenkins, Midland, MI (US); Stephen Paul Wilkowski, Midland, MI (US); Andrew Bosway, Austin, TX (US)

(73) Assignee: Scientific Anglers LLP, Arlington, VT (US)

( * ) Notice: Subject to any disclaimer, the term of this patent is extended or adjusted under 35 U.S.C. 154(b) by 0 days.

(21) Appl. No.: 15/466,635

(22) Filed: Mar. 22, 2017

(65) Prior Publication Data
US 2017/0273288 A1 Sep. 28, 2017

Related U.S. Application Data

(60) Provisional application No. 62/311,449, filed on Mar. 22, 2016.

(51) Int. Cl.
*A01K 91/12* (2006.01)
*B05D 1/18* (2006.01)
(Continued)

(52) U.S. Cl.
CPC ............... *A01K 91/12* (2013.01); *B05D 1/18* (2013.01); *A01K 91/16* (2013.01); *D06M 15/643* (2013.01); *D06M 15/657* (2013.01)

(58) Field of Classification Search
CPC .... A01K 91/12; A01K 91/0016; A01K 99/00; B05D 1/18; D02G 3/404; D02G 3/444; D06M 15/248; D06M 15/643; D06M 15/657; D06M 15/263; D06M 2101/34; D07B 1/02; D07B 2201/1024; D07B 2201/1096; D07B 2201/2087; D07B 2201/2092; D07B 2205/2071; D07B 2205/3071; D07B 2501/2038; D01F 8/12
See application file for complete search history.

(56) References Cited

U.S. PATENT DOCUMENTS

| | | |
|---|---|---|
| 3,043,045 A | 7/1962 | Martuch |
| 4,048,744 A | 9/1977 | Chandler |

(Continued)

FOREIGN PATENT DOCUMENTS

GB 2192522 1/1988

*Primary Examiner* — Laura C Powers
(74) *Attorney, Agent, or Firm* — BakerHostetler

(57) ABSTRACT

The present disclosure is to a fly fishing line and a method of making a fly fishing line. The method includes preparing a composition comprising a polymer resin, a co-polymer of silicone, and one or more other polymeric materials. The method includes applying the composition around an elongated core. The method also includes exposing the composition to conditions that form a coating around the elongated core thereby forming the fly-fishing line. The composition is a plastisol composition and the polymer resin is a polyvinyl chloride resin. The fly fishing lines include an elongated core a coating disposed around the elongated core. The coating comprises a polymer resin, a co-polymer of silicone, and one or more other polymeric materials.

19 Claims, 2 Drawing Sheets

(51) Int. Cl.
*A01K 91/16* (2006.01)
*D06M 15/657* (2006.01)
*D06M 15/643* (2006.01)

(56) References Cited

U.S. PATENT DOCUMENTS

| | | |
|---|---|---|
| 5,070,168 A | 12/1991 | O'Lenick, Jr. |
| 5,070,171 A | 12/1991 | O'Lenick, Jr. |
| 5,153,294 A | 10/1992 | O'Lenick, Jr. |
| 5,164,471 A | 11/1992 | O'Lenick, Jr. |
| 5,180,843 A | 1/1993 | O'Lenick, Jr. |
| 5,207,732 A | 5/1993 | Stark |
| 5,296,292 A | 3/1994 | Butters |
| 5,437,900 A | 8/1995 | Kuzowski |
| 5,446,114 A | 8/1995 | O'Lenick, Jr. |
| 5,625,976 A | 5/1997 | Goodale |
| 6,321,483 B1 | 11/2001 | Kauss et al. |
| 6,388,042 B1 | 5/2002 | O'Lenick, Jr. |
| 6,727,340 B1 | 4/2004 | O'Lenick, Jr. |
| 7,198,854 B2 * | 4/2007 | Dumont .................. C08L 83/04 252/8.61 |
| 7,247,696 B1 | 7/2007 | O'Lenick, Jr. et al. |
| 7,361,721 B1 | 4/2008 | O'Lenick, Jr. |
| 7,495,062 B1 | 2/2009 | O'Lenick, Jr. |
| 7,632,488 B1 | 12/2009 | O'Lenick, Jr. |
| 7,790,813 B2 | 9/2010 | O'Lenick et al. |
| 7,811,976 B1 | 10/2010 | O'Lenick, Jr. et al. |
| 7,834,116 B2 | 11/2010 | O'Lenick, Jr. et al. |
| 8,025,870 B2 | 9/2011 | O'Lenick et al. |
| 8,025,970 B2 | 9/2011 | Nakazaki et al. |
| 8,148,483 B2 | 4/2012 | O'Lenick, Jr. et al. |

* cited by examiner

FLY FISHING LINE AND METHOD FOR MANUFACTURING SAME

CROSS-REFERENCE TO RELATED APPPICATIONS

The present application claims the benefit of and priority to U.S. Provisional Application Ser. No. 62/311,449, filed Mar. 22, 2016, the entire disclosure of which is incorporated by reference into the present application.

FIELD OF THE DISCLOSURE

The present disclosure relates to a fly fishing line and a method for manufacturing same.

BACKGROUND

The fly fishing industry continues to seek an improved balance of properties in fly fishing lines. Durability with low recoil memory on the one hand and shootability on the other has been difficult to balance. Durability with low recoil memory is generally associated with line flexibility while shootability is generally associated with less flexible or more rigid lines. Lack of durability, associated with brittleness or hardness of the flyline, can result in cracking under the normal stresses encountered in casting a flyline. Shootability, on the other hand, is enhanced by a hard or stiff line. Shootability refers to the line "shooting" through the fly rod guides with less resistance (through reduced friction) than a more flexible line might encounter, with consequent increase in casting distance. Recoil memory refers to the tendency of a flyline to remain coiled in the position it assumes when disposed on the fly reel. Memory is generally considered to be directly related to the stiffness of the line.

Various constructions for fly fishing lines are known in the art. U.S. Pat. No. 3,043,045, issued Jul. 10, 1962 to Martuch describes a fly fishing line comprising a nylon base core treated with a uniform priming coating of an adhesive material. A coating composition comprised of polyvinyl chloride in plasticizers is superimposed over the priming or adhesive coating.

U.S. Pat. No. 4,048,744, issued Sep. 20, 1977 to Chandler describes a fly fishing line having a buoyant tip section formed near the tip of the line. The fishing line is described as comprising a core member made of nylon, polyethylene or silk filaments treated with a priming coating of adhesive material over which is superimposed a coating composition comprising a dispersion of finely divided polyvinyl chloride in plasticizer.

U.S. Pat. No. 5,207,732, issued May 4, 1993 to Stark describes a fly fishing line comprising a core with a coating adherently bonded to the core. The coating is described as comprising a polyvinyl chloride resin with an in situ formed polymer to provide stiffness to the line. The polymer is derived from at least one polymerizable monomer including a polyfunctional acrylic monomer. Inclusion of the acrylic polymer is said to improve the combination of properties of durability, shootability, and recoil memory.

U.S. Pat. No. 5,296,292, issued Mar. 22, 1994 to Butters describes an elongated cylindrical tensile article made of one or more strands of a monofilament core surrounded by porous polytetrafluoroethylene (PTFE) which may be optionally coated or die sized on the outer surface for smoothness and/or abrasion resistance. The described article is said to be particularly useful for fly-casting lines for fishing.

U.S. Pat. No. 5,437,900, issued on Aug. 1, 1995 to Kuzowski describes porous expanded PTFE having a microstructure of nodes interconnected by fibrils where the surface of the material is modified to have increased hydrophobicity. The modified surface with increased hydrophobicity is said to possibly improve the flotation characteristics of fly fishing lines with an outer surface of porous expanded PTFE.

U.S. Pat. No. 5,625,976, issued on May 6, 1997 to Goodale also describes fly fishing lines and methods for their manufacture. The described lines include a core line portion and a coating comprising a copolymer of olefin, preferably ethylene, and acrylic material. The described lines are said to have a specific gravity of less than 1.0 without the necessity of adding microspheres or blowing agents and are said to be plasticizer free.

U.S. Pat. No. 6,321,483, issued on Nov. 27, 2001 to Kauss, also describes fly fishing lines and methods for their manufacture. The described fly fishing line and method for the manufacture of the line includes a core and an outer coating disposed around the core. The coating comprises polyvinyl chloride polymer, polytetrafluoroethylene, and optionally polyacrylate derived from the polymerization of a polyfunctional polymerizable acrylate monomer. The method described in the Kauss patent comprises coating a core with a plastisol comprising a polyvinyl chloride resin, polytetrafluoroethylene, and optionally one or more monomers. The method includes exposing the plastisol to conditions providing formation of a polymer derived from the polyvinyl chloride resin and adding polytetrafluoroethylene throughout the polymer.

Commercially available flylines manufactured by Fly Fishing Technology Ltd. in the United Kingdom and advertised under the trade designation AlRFLO 7000 TS are said to include a "glass smooth polymer coating" which includes PTFE and liquid lubricants. The flylines are advertised as having a five year non-crack guarantee with "super floatability" due to the inclusion of PTFE into the outer coating of the line on all floating models. The outer coating of these lines is a urethane combined with the aforementioned PTFE.

The fly fishing industry has continued to experiment with flyline compositions in order to improve various properties such as shootability, durability, floatability and the like.

SUMMARY

An embodiment of the present disclosure is a method of making a fly fishing line. The method includes applying a composition around an elongated core, with the composition comprising a polymer resin, a co-polymer of silicone, and one or more other polymeric materials. The method also includes exposing the composition to conditions that form a coating around the elongated core thereby forming the fly-fishing line. The composition may be a plastisol composition and the polymer resin may be a polyvinyl chloride resin. Another embodiment of the present disclosure is a fly fishing line. The fly fishing line includes an elongated core and a coating disposed around the elongated core. The coating comprises a polymer resin, a co-polymer of silicone, and one or more polymeric materials.

BRIEF DESCRIPTION OF THE DRAWINGS

The foregoing summary, as well as the following detailed description of the illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION

Figure 1:
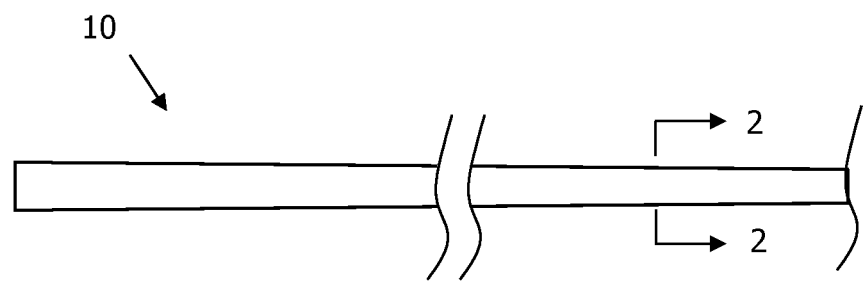
FIG. 1 is a schematic side view of a fly fishing line according to an embodiment of the present disclosure.
Figure 2:
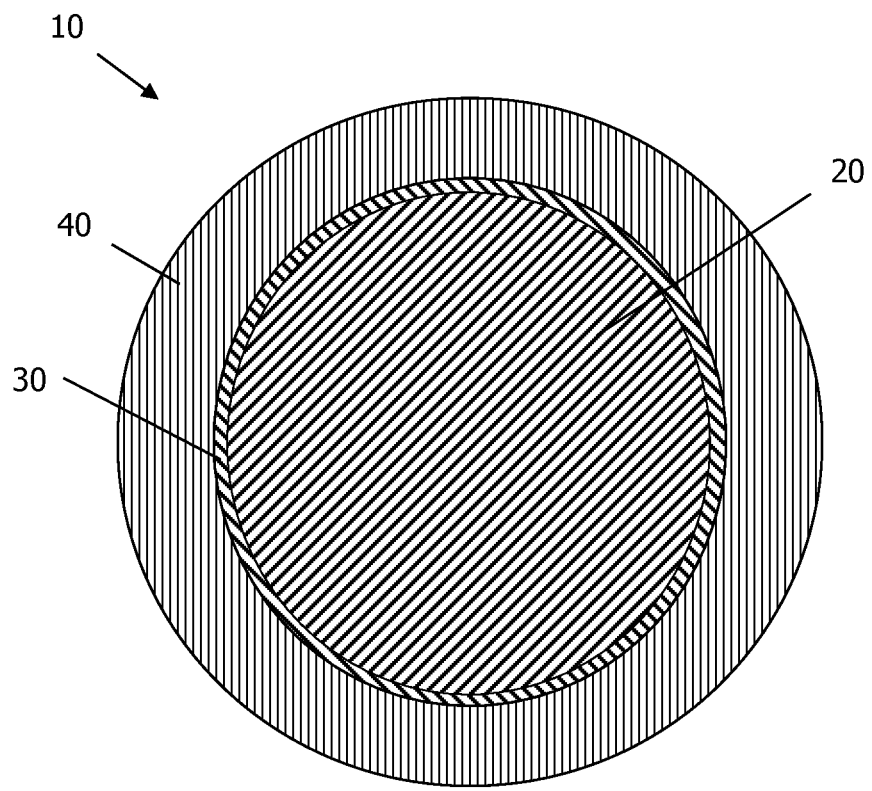
FIG. 2 is a cross-sectional view of fly fishing line taken along line 2-2 in FIG. 1.

Embodiments of the present disclosure provides a fly fishing line 10 (FIGS. 1 and 2) and a method 100 (FIG. 3) for the manufacture of fly fishing line 10. Referring to FIGS. 1 and 2, the fly fishing line 10 has an elongated core 20, an optional primer layer 30, and an outer coating 40 disposed around the elongated core 20 and along a length of the elongated core 20. The outer coating 40 may include a polymer resin and one or more co-polymers of silicone. The fly fishing line, also referred to as a flyline, has enhanced properties over typical flylines, such as improved drag properties, which contribute to better shootability and retraction in use. As further described below, the outer coating 40 may include one or more other optional components such as plasticizers, a lubricant, a UV stabilizer, a heat stabilizers and the like.

The elongated core 20 may be an elongate element suitable for use as a fishing line, and preferably as a fly-fishing line. The elongated core 20 extends through the central portion of the flyline 10, preferably along the entire length of the flyline 10. The elongated core 20 may be comprised of polyamide 6, polyamide 6,6, polypropylene, polyethylene, polyethylene terephthalate, or silk filaments. The elongated core 20 may take the form of a yarn, a single monofilament, a braided material, or the like. In one example, the elongated core is an extruded filament. The elongated core 20 may be formed from other materials that are apparent to those skilled in the art, and the invention is not limited to one elongated core construction over another.

The flyline 10 may include an optional primer 30 disposed between the elongated core 20 and the outer coating 40. The optional primer 30 improves adhesion of the outer coating 40 to the surface of the elongated core 20. A suitable primer composition may include elastomers. In one example, the primer may be a nitrite elastomer or rubber dissolved for application in methyl ethyl ketone. Such a primer is available under the trade designation "Vulcabond V-36" from Stabond Corporation. In another example, the primer composition can be a polyester bulk polymerized urethane elastomer with hydroxyl groups. This particular primer is also dissolved in methyl ethyl ketone for application to the elongated core 20. Such a primer is available under the trade designation "Morthane CA-100" from Morton Thiokol, Inc. In some instances, a primer may not be needed to adequately adhere the coating to the elongated core 20. For instance, an outer coating 40 may more readily adhere to a braided elongated core. In other cases, the elongated core and outer coating may be coextruded together into a fly fishing line as described herein.

The outer coating 40 may include a number of different components depending on the intended product and application needs. In one example, the outer coating 40 is formed by applying a plastisol composition to the elongated core 20 during production of the flyline 10 as will be further detailed below. The plastisol composition includes a polymer resin, a co-polymer of silicone, one or more polymeric materials, and one or more additional components. The additional components may include plasticizers, a lubricant, a UV stabilizer, heat stabilizers, and the like.

In on embodiment, the polymer resin may include a polyvinyl chloride (PVC) resin. A suitable polyvinyl chloride resin is known under the trade designation 11 Geon 12111 available from BF Goodrich. However, the polymer resin may also include a polymer resin, such as PVC, in combination with one or more optional monomers. The optional monomers may comprise between 2% to 8% by weight of the plastisol composition. In one example, the optional monomer is a polymerizable and polyfunctional acrylic monomer. When the aforementioned acrylic monomer is included within the plastisol, the resulting outer coating will have an acrylic polymer incorporated therein. Other suitable monomers may be compatible with other components within the plastisol with consistent effects on the outer coating. For example, additional acceptable monomers include tetraethylene glycol diacrylate, 1,6 hexanediol dimethacrylate, and trimethylolpropane trimethacrylate (TMPTMA). TMPTMA is commercially available from Sartomer Company under the trade designation 11 SR 35011. When the TMPTMA, or some other monomer, is added to the plastisol composition, an initiator can be optionally included in the plastisol composition to initiate the polymerization reaction during manufacturing.

One or more optional heat stabilizers and UV stabilizers may be added in minor amounts to the plastisol composition stabilize the outer coating 40 of the flyline. Suitable heat stabilizers are known to those skilled in the art and may include an organo barium zinc stabilizer. Such a stabilizer is available under the trade designation "SYNDRON-940" from Ferro Corporation of Schreve, Ohio. A suitable ultraviolet (UV) stabilizer is that available under the trade designation "UVINOL 3039" available from BASF Corporation of Mount Olive, N.J. It should be appreciate that other heat and UV stabilizers may be used.

The plastisol composition may include one or more plasticizers. Plasticizers may be used in the composition to produce or promote plasticity and flexibility and to reduce brittleness. Suitable plasticizers may include, but are not limited to, ditridecyl phthalate, epoxidized 2-ethyl hexyl tallate, diundecyl phthalate, dioctyl adipate, and the like. In one example, ditridecyl phthalate is present optimally at about 25 parts per 100 parts (PHR) of polymer resin. However, other levels or possible. Epoxidized 2-ethyl hexyl tallate is another plasticizer containing epoxy groups which aid in the heat stabilizing ability of the barium zinc liquid (when present) in the plastisol composition. The epoxidized 2-ethyl hexyl tallate should preferably comprise at least about 5 parts per 100 PHR. In one example, a nonpolymerizable plasticizer may be present in on the order of 40 to 55 PHR. It will be understood that variations in the level of this and other conventional ingredients are possible and are considered within the scope of the present disclosure. Other suitable plasticizers may also be apparent to those skilled in the art and the invention is not to be construed as limited to any one or more plasticizers, either used alone or in combination in the plastisol composition of the present invention. However, other plasticizers not specifically listed herein may be included as is known to a person of skill in the art.

The plastisol composition may include optional lubricants. In one example, an optional lubricant is an unmodified silicone. The unmodified silicone may be present in at least 1% by weight of the plastisol composition. In another example, unmodified silicone is present in the level of about 1% by to about 6% by weight of the plastisol composition. An unmodified silicone is available under the trade designation 11 DC-20011 (referred to as "DC-200 silicone") from Dow Corning of Midland, Mich. The DC-200 silicone provides processing advantages in the process described further below. Such an unmodified silicone has a viscosity of at least 100,000 Cst (25° C.) prior to mixing into the composition. The DC-200 silicone is a high viscosity polydimethylsiloxane polymer typically having the following chemical composition: (CH3)sSiO[Sio(CH3)2]nSi(CH3)3.

The plastisol composition may include one or more co-polymer silicone additives in order to improve the properties of the resulting flyline 10. With the inclusion of co-polymer silicone additives in the outer coating 40, it has been found that the flylines as described herein possess enhanced durability and shootability when compared with flylines without co-polymer silicone additives. The co-polymer silicone additives may be added to the plastisol are in a liquid form. Preferred co-polymer silicones include "cross-linkable" silicones and fluorinated silicones. The term "cross-linkable" refers to copolymers of silicones that have the ability or potential to cross-link in composition, but it is not supplied as a "cross-linked" polymer. Accordingly, during the method as described below, the cross-linkable silicones are added to the composition. During later stages in the method, the cross-linkable silicones are partially or fully cross-linked, resulting in a partially or fully cross-linked silicone in the outer coating. Exemplary co-polymer silicones are known under the trade designations Silmer® TMS Di-10, Silmer® TMS Di-100, Fluorosil® J-15, Fluorosil® OH C7-F, Silwax F, all available from Siltech Corporation of Ontario, Canada.

In one example, the co-polymer of silicone in a cross-linkable silicone. For instance, such a cross-linkable silicone may include a trimethoxysilane pre-polymer, e.g. trimethoxy polydimethylsiloxane. Trimethoxy polydimethylsiloxane is available under the trade designation Silmer® TMS Di-10. The viscosity of Silmer® TMS Di-10 is about 15 cSt (at 25° C.) prior to preparing the composition. Another cross-linkable silicone may include a trimethoxysilane terminated polysiloxane, which is available under the trade designation Silmer® TMS Di-100. The viscosity of TMS Di-100 is about 60 cSt (at 25° C.) prior to preparing the composition. Both the Silmer® TMS Di-10 and TMS Di-100 are 100% active trialkoxy functional cross-linking silicones. In particular, these silicone copolymers are trimelthoxysilane functionalized siloxanes that can cure by condensation with silanols, organic hydroxyl groups, and other aloxy silane materials. TMS Di-10 and TMS Di-100 provide durability, shine, water repellency, and release properties of the flyline.

The cross-linkable silicone can be present in the plastisol composition at a range of levels. For example, the cross-linkable silicone comprises between 1% and 10% by weight of the composition. In another example, the cross-linkable silicone comprises between 1% and 9% by weight of the composition. In another example, the cross-linkable silicone comprises between 1% and 8% by weight of the composition. In another example, the cross-linkable silicone comprises between 1% and 7% by weight of the composition. In another example, the cross-linkable silicone comprises between 1% and 6% by weight of the composition. In another example, the cross-linkable silicone comprises between 1% and 5% by weight of the composition. In another example, the cross-linkable silicone comprises between 1% and 4% by weight of the composition. In another example, the cross-linkable silicone comprises between 1% and 3% by weight of the composition. In another example, the cross-linkable silicone comprises between 1% and 2.5% by weight of the composition. In yet another example, the cross-linkable silicone comprises 1%, 2%, 2.5%, 3%, 4%, 5%, 6%, 7%, 8%, 9%, or 10% by weight of the composition.

In another embodiment, the co-polymer of silicone is a fluorinated silicone. The fluorinated silicone may include, but is not limited to, a fluorinated polydimethylsiloxane, a fluorinated polydimethylsiloxane propylhydroxy copolymer, or a polysiloxane mixture including fluoroalkyl and organic materials.

One example of a fluorinated polydimethylsiloxane is available under the trade designation Fluorosil® J-15 from Siltech Corporation referred to above. Fluorosil® J-15 has a viscosity is about 500 cSt (at 25° C.) prior to preparing the plastisol composition. Fluorosil® J-15 provides excellent lubricity, gloss, and emmoliency properties. For industrial applications, the unique properties of Fluorosil® J-15 provide benefits such as solvent resistance, lubricity, softness, and slip. An example of the fluorinated polydimethylsiloxane propylhydroxy copolymer is available under the trade designation Fluorosil® OH C7-F from Siltech Corporation. The viscosity of Fluorosil® OH C7-F is about 90 cSt (at 25° C.) prior to forming plastisol composition. The unique properties of Fluorosil® OH C7-F provide benefits such as solvent, stain, mar, and fingerprint resistance, flexibility, lubricity, softness, and slip. The primary hydroxyl group provides reactivity with moieties such as isocyanate, epoxy, and esters. The molecules migrate to outer surfaces, and react into the matrix giving improved properties and substantivity. In the absence of groups with which it can react, the hydroxyl groups provides hydrogen bonding to surfaces, again providing substantivity. The Fluorosil® J-15 and Fluorosil® OH C7-F silicones provide solvent resistance, lubricity, softness, and slip. An example of the polysiloxane mixture is available under the trade designation Silwax F available from Siltech Corporation. In general, all the fluorinated silicones described herein may have a viscosity of less than 600 cSt (at 25° C.), prior to preparing the plastisol composition.

The fluorinated silicone may be present in the plastisol composition at a range of levels. For example, the fluorinated silicone may comprise between 1% and 10% by weight of the composition. In another example, the fluorinated silicone comprises between 1% and 9% by weight of the composition. In another example, the fluorinated silicone comprises between 1% and 8% by weight of the composition. In another example, the fluorinated silicone comprises between 1% and 7% by weight of the composition. In another example, the fluorinated silicone comprises between 1% and 6% by weight of the composition. In another example, the fluorinated silicone comprises between 1% and 5% by weight of the composition. In another example, the fluorinated silicone comprises between 1% and 4% by weight of the composition. In another example, the fluorinated silicone comprises between 1% and 3% by weight of the composition. In another example, the fluorinated silicone comprises between 1% and 2.5% by weight of the composition. In yet another example, the fluorinated silicone comprises 1%, 2%, 2.5%, 3%, 4%, 5%, 6%, 7%, 8%, 9%, or 10% by weight of the composition.

In another embodiment, the plastisol composition may comprise at least two co-polymers of silicone. For instance, the plastisol composition may comprise a first co-polymer of silicone and a second co-polymer of silicone. In such an embodiment, the first co-polymer of silicone is a cross-linkable silicone and the second co-polymer of silicone is a fluorinated silicone. For example, the first co-polymer of silicone is a cross-linkable silicone, such as Silmer® TMS Di-10 and the second co-polymer of silicone is a fluorinated silicone, such as Flurorsil® J-15, each of which are described in detail above. The first and second co-polymers of silicone can be present in the plastisol composition at a range of levels. For example, the first and second co-polymers of silicone may comprise between 1% and 10% by weight of the composition. In another example, the first and second co-polymers of silicone comprise between 1% and 9% by weight of the composition. In another example, the first and second co-polymers of silicone comprise between 1% and 8% by weight of the composition. In another example, the first and second co-polymers of silicone comprise between 1% and 7% by weight of the composition. In another example, the first and second co-polymers of silicone comprise between 1% and 6% by weight of the composition. In another example, the first and second co-polymers of silicone comprise between 1% and 5% by weight of the composition. In another example, the first and second co-polymers of silicone comprise between 1% and 4% by weight of the composition. In another example, the first and second co-polymers of silicone comprise between 1% and 3% by weight of the composition. In another example, the first and second co-polymers of silicone comprise between 1% and 2.5% by weight of the composition. In yet another example, the first and second co-polymers of silicone comprises 1%, 2%, 2.5%, 3%, 4%, 5%, 6%, 7%, 8%, 9%, or 10% by weight of the composition.

The fly fishing line 10 as described herein may be a floating fly fishing line or a sinking fly fishing line. A floating flyline made as described herein has, for example, a specific gravity of 0.9 or less. Density modifiers may be added to the plastisol composition to impart floatability to the flyline. The density modifiers may include microspheres, micro balloons, gas filled cells, blowing agents, or other known ingredients. In one example, the outer coating of the flyline 10 may include glass microspheres to impart floatability. Suitable glass microspheres may be made from soda lime borosilicate glass and are commercially available from the Minnesota Mining & Manufacturing Company of St. Paul, Minn. under the trade designation bubble type G18/500. The nominal average particle density of the glass microspheres is about 0.18 grams per cubic centimeter. The isotactic strength of the glass microspheres is about 6.90 Kn/m2 (500 psi). However, the glass microspheres may have different physical parameters from those specifically stated herein. Alternatively, the flyline 10 may be a sinking line that is devoid of materials that impart floatability. In still other embodiments, the flyline 10 may include the combined properties of both a floating line and a sinking line.

Figure 3:
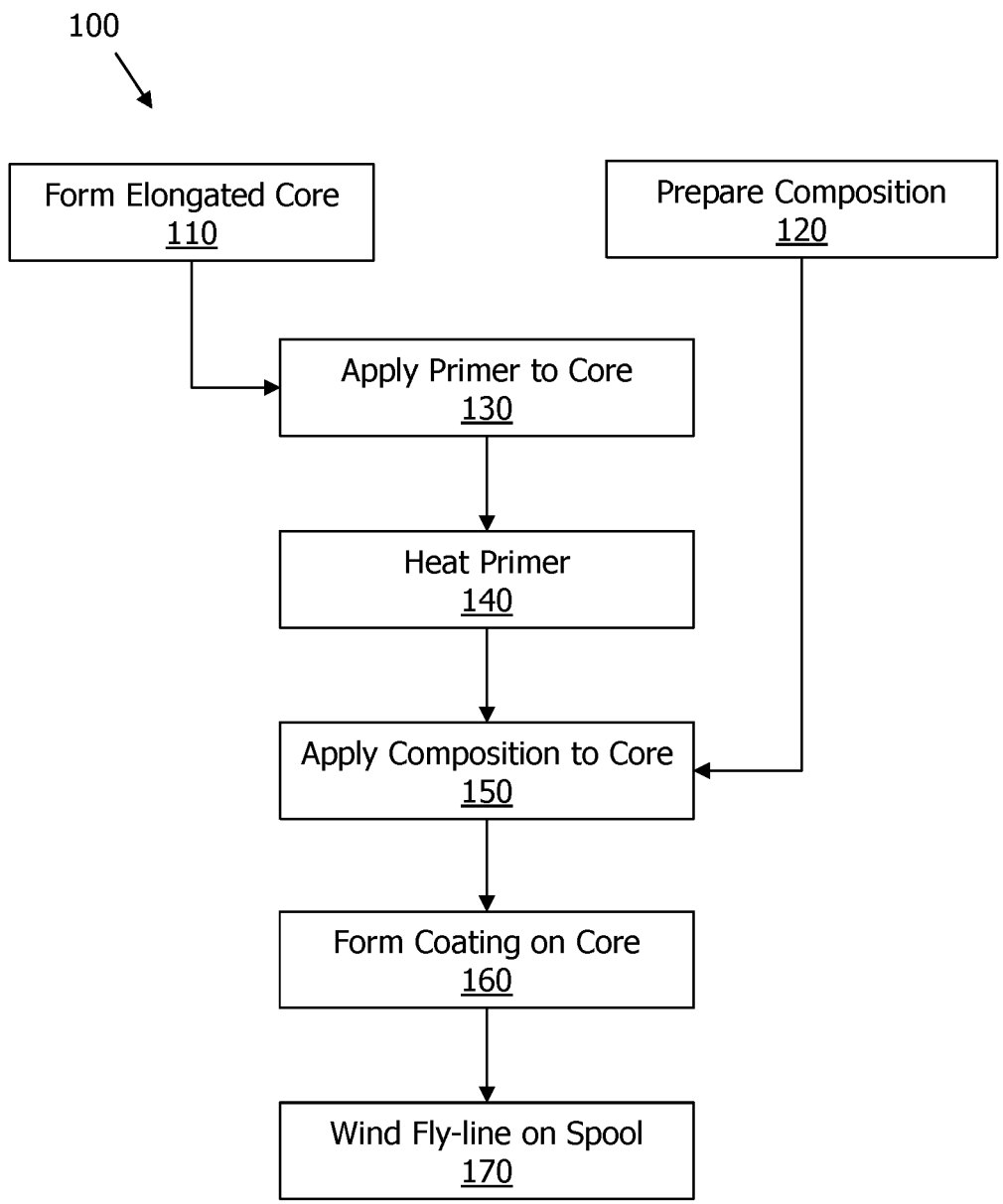
FIG. 3 is a diagram illustrating an exemplary method of manufacturing a fly fishing line according to an embodiment of the present disclosure.

Another embodiment of the present disclosure is a method 100 for forming the flyline 10 as shown in FIG. 3. Step 110 includes forming the elongated core 110. The process for forming the elongated core may include extrusion and/or braiding multiple filaments into the desired elongated core. In some instances, the elongated core 20 can be manufactured to include the taper typical in flylines. In other embodiments, later processing steps may be used to form the desired taper in the flyline. In any event, elongated core 20 may be manufactured on site. Alternatively, the elongated core 20 can be manufactured by a third party and shipped to the manufacturing location where the flyline is ultimately manufactured. Processes known in the art may be used to manufacture the elongated core 20.

In step 120, the plastisol composition is prepared. In preparing the plastisol composition, initially a base composition is formed that includes the polymer resin (e.g. a polyvinyl chloride resin), plasticizers, and other additives (e.g., lubricant, UV stabilizer, heat stabilizer, etc.). The components of the base composition are placed within a suitably sized reaction vessel. The amount of plasticizer should generally be within the range 45 to 55 parts per 100 parts (PHR) of polymer resin. Lubricants and other known additives maybe added in amounts sufficient to achieve the desired properties. In one example, a lubricant in the form an unmodified silicone (e.g. DC-200) may be added at a level of about 1% by weight to about 6% by weight based on the weight of the entire plastisol composition. The base composition is then mixed and/or agitated at a relatively low speed for a predetermined period of time. In one example, mixing and/or agitating may occur for 4-6 minutes until the base composition is well blended and the polymer resin is coated with the plasticizers. The resulting base composition is then mixed at a higher speed for 9 to 12 minutes to continue to disperse the polymer resin within the plasticizer and additive blend to form a uniform base composition.

Step 120 continues by combining one or more of the aforementioned co-polymer silicones to the base composition. The co-polymer silicone and base composition is then mixed thoroughly to provide a uniform plastisol composition. As described above, the co-polymer silicones are added to the plastisol composition at a level between 1% to about 10% by weight of the plastisol composition. In another example, the co-polymer of silicone comprises between 1% and 9% by weight of the plastisol composition. In another example, the co-polymer of silicone comprises between 1% and 8% by weight of the plastisol composition. In another example, the co-polymer of silicone comprises between 1% and 7% by weight of the plastisol composition. In another example, the co-polymer of silicone comprises between 1% and 6% by weight of the composition. In another example, co-polymer of silicone comprises between 1% and 5% by weight of the composition. In another example, co-polymer of silicone comprises between 1% and 4% by weight of the composition. In another example, the co-polymer of silicone comprises between 1% and 3% by weight of the composition. In another example, the co-polymer of silicone of silicone comprises between 1% and 2.5% by weight of the composition. In yet another example, the co-polymer of silicone comprises 1%, 2%, 2.5%, 3%, 4%, 5%, 6%, 7%, 8%, 9%, or 10% by weight of the composition. It should be appreciated that that the compositions can be based on the amount of plastisol composition.

Optionally, one or more acrylic monomers may be added to the plastisol composition and mixed at a medium speed for a suitable period of time (e.g., 15-22 minutes). The acrylic monomer comprises between 1% to 6% by weight of the plastisol composition.

The plastisol composition may be held at this point until needed for application step 150 further described below. Just prior to applying the plastisol composition the elongated core, the optional density modifier (e.g. glass microspheres) and pigments may be added to the plastisol composition. The density modifiers may comprise between 0.1% up to about 14% by weight of the plastisol composition. Pigment is added in an amount sufficient to achieve a desired color, typically between about 1% to 12% by weight of the plastisol composition. The plastisol composition may be deaerated under vacuum to remove trapped air in the plastisol composition.

Continuing with FIG. 3, step 130 is an optional step of applying primer to the elongated core. In step 130, the elongated core is passed through a primer tank holding a primer composition to apply the primer to the elongated core. At step 140, the primer composition (on the core) is then passed through a heating unit that exposes the primer composition to a desired temperature in order to drive off solvents and remove any absorbed water from the elongated core. In one example, a suitable temperature is at least about 176° C. (about 350° F.)

In step 150, the plastisol composition is applied to the elongated core. In this instance, the elongated core is fed into an application unit that includes one or more suitable tanks that contain the plastisol composition, a variable orifice wipe die, and a forced air oven. The elongated core is fed through the tanks and dipped into the plastisol composition. Then, the elongated core is brought through the variable orifice wipe die to shape the coating diameter and give the flyline its proper tapered configuration.

In step 160, the plastisol composition disposed around the elongated core is exposed to conditions sufficient to form a durable outer coating. This results in the desired flyline 10 as described herein. In one example, the coated elongated core may run vertically under low tension (about 6.89 Kn/m2 to 10.34 Kn/m2) through the forced air oven at an elevated temperature. In one example, the plastisol composition is exposed to a temperature between 145° C. and 205° C. In another example, the temperature is between 175° C. and 200° C. In another example, the temperature is between 185° C. and 195° C. The elevated temperatures fuses the polymer resin to the primer and thus to elongated core. The elevated temperature can also polymerize the acrylic monomer, if present. The elongated core may pass through the application unit at a speed of 7 to 15 feet per minute. The result is the formation of a durable outer coating on the elongated core. The completed flylines exiting the application unit can be air cooled during its return to coiling skeins prior to winding 170 into finished lines on the spools. Through the method 100, the flyline is partially stretched in a straight configuration. This results in improved stiffness in use.

Embodiments of the present disclosure also include an alternative embodiment for manufacturing the flyline. In accordance with the alternative embodiment, the composition that forms the outer coating of the flyline can be co-extruded with the elongated core. In other words, as the elongate core is extruded to form the core of the flyline, the outer coating as described herein can be co-extruded around the outer surface of the elongated core. The outer coating and elongated core are then cooled, e.g. quenched, as it typical is in filament extrusion processing. In such an embodiment, the composition disposed around the elongated core is exposed to conditions sufficient to form a durable outer coating. Such conditions may include cooling the outer coating and elongated core following extrusion. The cooled fly-line can be then be spooled for packaging. In other words, as the elongate core is extruded to form the core of the flyline, the outer coating as described herein can be co-extruded around the outer surface of the elongated core. In another embodiment, the elongate core can be formed and then an outer coating extruded over the elongate core. Furthermore, in such alternative embodiments, the composition may include one or more co-polymer silicone additives. As described herein the co-polymer silicone include crosslinkable silicones and/or fluorinated silicones.

The aforementioned method (and alternatives thereof) forms an outer coating on a fly fishing line 10 having a desired combination of properties. Notably, the outer coating of the present invention provides a flyline with improved shootability and durability. In examples where acrylic monomers are used, floatability and memory may also be enhanced with the inclusion of the acrylic polymer and density modifiers or the like for floatability. Improved shootability and durability is seen with the incorporation of the co-polymer silicon's within the polymer resin coating. Shootability translates into a property resulting in longer, more accurate casts while durability provides a line that lasts longer under normal use. Inclusion of the co-polymer silicone also provides flylines with improved hydrophobicity and better resistance to icing in cold weather casting. Shootability and durability are further enhanced by the incorporation of the co-polymer silicone and acrylic polymer (when present) with the resulting three dimensional polymer network within the outer coating increasing the stiffness of the flyline while retaining its integrity. The increased stiffness results from the polymerization process with the flyline partially stretched in a straight configuration during its processing. The polymer network is in its lowest energy state when the flyline is straight. At warmer temperatures, the flyline will readily straighten when taken off the reel. At cooler temperatures, memory may be somewhat more difficult to remove from the line, requiring several casts to eliminate the coil of the flyline resulting from its storage on the reel.

The features of the present disclosure will be further illustrated in the non-limiting examples set forth below. In the examples, all concentrations are in parts by weight unless otherwise indicated.

EXAMPLES

Procedure A (Flyline Manufacture)

Flylines were manufactured by preparing a plastisol base composition A with the ingredients shown in Table 1. A core was used comprised of braided nylon multifilaments. The plastisol base composition A was prepared by dispersing the vinyl resin within the plasticizers and other additives (e.g., lubricant, UV stabilizer, heat stabilizer) in a suitably sized reaction vessel, and then mixed and agitated for five minutes until blended. The plastisol base composition A was mixed at a low speed until the vinyl resin appeared to be fully coated with plasticizer. The resulting paste was mixed at a higher speed for about 10 minutes to further disperse the resin within the plasticizer and additive blend to form the plastisol base composition A.

The plastisol base composition A was used to make the flylines of the examples, described hereinafter, with additional ingredients (e.g., co-polymer silicone additives, glass microspheres, TMPTMA monomer, etc.) added to the base as indicated in the individual examples prior to coating the plastisol onto the core. The flyline core was first passed through a primer tank to add primer (Morthane CA-10011 primer from Morton Thiokol 11) in order to improve adhesion of the outer coating to the core surface. The primed core was heated to 350° F. to dry off all solvents within the primer and remove absorbed water from the core. The core was dipped into a tank containing the plastisol composition and then brought through a variable orifice wipe die to shape the coating diameter and give the line a desired configuration. The coated line was run vertically under low tension (about 1 to 5 p.s.i.) through a forced air oven at a speed from about 7 to 15 feet per minute line speed and at an oven temperature of 193° C. (380° F.) to fuse the vinyl. The lines were air cooled to a non-tacky state for at least 24 hours prior to testing.

TABLE 1

The plastisol base composition A

| Component | Trade Designation | Parts per Hundred of Resin (PHR) | Function |
|---|---|---|---|
| Polyvinyl chloride | GEON 121 | 100 | Resin |
| Dioctyle adipate | DOA | 14 | Plasticizer |
| Epoxidied 2-ethyl hexyl tallat | Monoplex S-73 | 16 | Plasticizer |
| Diundecyl phthalate | DUP | 25 | Plasticizer |
| Unmodified silicone oil | DC-200 | 5 | Lubricant |
| Organo barium zinc stabilizer | SYN-940 | 2 | Heat Stabilizer |
| UV absorber | Univol 3039 | 0.8 | UV Stabilizer |

Flyline examples 1-3 are flylines using 29.51 kg of The plastisol base composition A to which was added 205 grams glass microspheres (available from Minnesota Mining and Manufacturing Company, St. Paul Minn. under the trade designation G18/500), 56 grams of a fluorochemical for improved hydrophobicity (available from Minnesota Mining and Manufacturing Company, under the trade designation FC-3537), and respectively, 1% by weight (Example 1), 2% by weight (Example 2), and 2.5% by weight (Example 3) of a cross-linkable silicone (commercially obtained from Siltech Corporation under the trade designation "Silmer® TMS Di-10").

Flyline examples 4-6 are flylines made using 29.51 kg of The plastisol base composition A to which was added 205 grams glass microspheres (commercially from Minnesota Mining and Manufacturing Company under the trade designation G18/500), 56 grams of fluorochemical for improved hydrophobicity (commercially available from Minnesota Mining and Manufacturing Company, under the trade designation FC-3537), and respectively, 1% by weight (Example 4), 2% by weight (Example 5), and 2.5% by weight (Example 6) of a cross-linkable silicone (commercially obtained from Siltech Corporation under the trade designation "Silmer® TMS Di-100").

Flyline examples 7-9 are made using 29.51 kg of The plastisol base composition A to which was added 205 grams glass microspheres (commercially from Minnesota Mining and Manufacturing Company under the trade designation G18/500), 56 grams of fluorochemical for improved hydrophobicity (commercially available from Minnesota Mining and Manufacturing Company under the trade designation FC-3537), and respectively, 1% by weight (Example 7), 2% by weight (Example 8), and 2.5% by weight (Example 9) of a fluorinated silicone additive (commercially obtained from Siltech Corporation under the trade designation "Fluorosil® J-15").

Flyline examples 10-12 are flylines made using 29.51 kg of The plastisol base composition A to which was added 205 grams glass microspheres (commercially from Minnesota Mining and Manufacturing Company under the trade designation G18/500), 56 grams of fluorochemical for improved hydrophobicity (commercially available from Minnesota Mining and Manufacturing Company under the trade designation FC-3537), and respectively, 1% by weight (Example 10), 2% by weight (Example 11), and 2.5% by weight (Example 12) of a fluorinated silicone additive (commercially obtained from Siltech Corporation under the trade designation "Fluorosil® OH C-7F").

Flyline compositions examples 13-18 are additional set of flylines made for comparative testing purposes. Example 13 is a flyline made using 29.51 kg of the plastisol base composition A to which was added 5% by weight of a fluorochemical with a trade designation J-14 STD00 PTFE available from the Minnesota, Mining, & Manufacturing Company. Example 13 is designated as the control in table 2 below.

Example 14 is a flyline made using 29.51 kg of The plastisol base composition A to which was added 3% by weight (Example 14) of a cross-linkable silicone (commercially obtained from Siltech Corporation under the trade designation "Silmer® TMS Di-10"). Examples 15 and 16 are flylines made using 29.51 kg of The plastisol base composition A to which was added, respectively, 3% by weight (Example 15) and 5% by weight (Example 16) of a fluorinated silicone (commercially obtained from Siltech Corporation under the trade designation "Fluorosil® J-15").

Example 17 is a flyline made using 29.51 kg of the plastisol base composition A to which was 3% by weight (Example 15) of a fluorinated silicone additive (commercially obtained from Siltech Corporation under the trade designation "Fluorosil® OH C-7F").

Example 18 is flyline made using 29.51 kg of the plastisol base composition A to which was added 3% by weight (Example 18) of a fluorinated silicone (commercially obtained from Siltech Corporation under the trade designation "Silwax F").

Test Procedure A (Drag Reduction for Examples 1-12)

The method used in the flyline drag test quantifies the slickness or "shootability" of a flyline. Slick lines have a lower coefficient of friction and shoot through the guides of the fly rod without much resistance. A low drag value is a desired characteristic of flylines. Drag data was collected by cutting 50 inch test samples from example flylines. The sample is cleaned by first wiping with a wet, lint-free paper towel followed by a dry, lint-free paper towel. The test involved inserting one end of the sample into an upper grip of an Instron machine and locking it into place. The sample is then guided under a stainless steel dowel and then over a stainless steel roller, keeping the line in a groove in the roller. Attached to the free end of the specimen is a 50 gram weight to provide constant tension. The Instron then is started whereby the specimen is pulled for a 3 inch distance at a rate of 35 inches per minute for each cycle and then automatically returned to a starting point. The Instron measures the load during the pull operation and thus captures the drag force. The drag measurement starts after 0. 25" of travel. The first 10 peaks and valleys (after the initial travel indicated above) of the drag curve are averaged to obtain an average drag value. The sample is tested in this manner 10 consecutive times, or some other statistically significant number. For purposes of testing, the samples should have a consistent diameter. In the examples below, a diameter of 0.037 inches was used. However, it is believed that the drag data would have similar effects at higher diameters. Typically, the first sample is discarded as the line finds its natural path in the apparatus. The average drag values were then compared to the control to obtain a drag improvement value according to the following formula Drag Improvement [Additive vs. Control]

$$\frac{(Avg.\ Drag\ [Control] - Avg.\ Drag\ [Additive])}{Avg.\ Drag\ [Control]}$$

Comparative testing was conducted in order to determine overall performance of the silicone additives for each of the flylines of Examples 1-18. The comparative testing including measuring drag of the test flylines. Generally, the fluorinated silicone additives, Fluorosil® J-15, and Fluorosil® OH C-7F (Examples 7-12) demonstrated improved performance relative to the Silmer® additives (Examples 1-6). In particular, the largest reductions in drag among examples 1-12 occurred with the 1% by weight co-polymer silicone Fluorosil® OH C-7F and the 2.5% by weight of co-polymer silicone Fluorosil® J-15.

Drag reduction comparisons for example flylines 1-12 using average values were performed using the plastisol base composition A with the additive of 1% by weight Teflon® relative to the same plastisol with the additive of 2.5% by weight Fluorosil® J-15 (Example 9). The drag of the flyline with the additive Teflon® was measured at 1.3 ozf. The drag of the flyline with 2.5% by weight Fluorosil® J-15 was 1.1 ozf. Thus, the percent reduction in drag between the Teflon® treated flyline and the 2.5% Fluorosil® J-15 treated flyline was 15%. In a similar comparison, the flyline comprising a plastisol with the additive of 1% by weight Teflon® versus a flyline comprising a plastisol with a 1% by weight OH C-7F Fluorosil® additive (example 10), resulted in an 8% reduction in drag.

Test Procedure B (Drag Reduction Examples 13-18).

Table 2 below summarizes the drag data obtained from running comparative tests for Examples 13-18 above.

TABLE 2

Drag Force Data for Examples 13-18

| Example | Comment | Average Drag Force (ozf) | % Drag Reduction |
|---|---|---|---|
| 13 | (5% Teflon J-14) | 9.1 | Control |
| 14 | 3% Silmer ® TMS Di-10 | 6.1 | 33% |
| 15 | 3% Fluorosil ® J-15 | 49 | 46% |
| 16 | 5% Fluorosil ® J-15 | 5.2 | 43% |
| 17 | 3% Fluorosil ® OH C7-F | 6.5 | 28% |
| 18 | 3% Silwax F | 7.2 | 20% |

As can be seen in table 1, example 15 displayed significant and unexpected reductions in drag force. For instance, example 15, which includes 3% Fluorosil® J-15 demonstrated a 46% reduction in drag force compared to the control. From the data above, having 3% level of co-polymer of silicone results in at least a 20% reduction in drag compared to the control.

Test Procedure C (Durability)

Flyline durability was tested on a test apparatus comprised of a rotating disc or reel capable of cycling a section (21 inches) of a flyline through a fly rod tip at 2500 cycles per hour. One end of the line is attached to the aforementioned disc and the other end of the line is attached to a 50 gram weight. 10,000 cycles correlates with about 100 hours of line use. Durability tests of the exemplary flylines were conducted. The durability of fly fishing lines comprising a 2.5% by weight J-15 Fluorosil® additive (i.e. example 9) provided 6 out of 8 samples that survived to 50,000 cycles (i.e. 500 hours of line use).

As used herein, the terms "comprises," "comprising," "includes," "including," "has," "having" or any other variation thereof, are intended to cover a non-exclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, chemical or biological degradation of solutions over time, stress exerted on structures, and combinations thereof, for example.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present). An inclusive or may be understood as being the equivalent to: at least one of condition A or B.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, step, or characteristic described in connection with the embodiment is included in at least one embodiment. The appearances of the phrase "in one embodiment" in various places in the specification are not necessarily all referring to the same embodiment.

The inventive concepts disclosed herein are not limited in their application to the details of construction and the arrangement of the components or steps or methodologies set forth in the above description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting the inventive concepts disclosed and claimed herein in any way. Furthermore, numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

What is claimed:

1. A fly fishing line comprising:
   an elongated core; and
   a coating disposed around the elongated core, wherein the coating comprises a polymer resin, a co-polymer of silicone, and one or more other polymeric materials,
   wherein the co-polymer of silicone is a fluorinated polydimethylsiloxane, a fluorinated polydimethylsiloxane propylhydroxy copolymer, or a combination thereof.

2. The fly fishing line of claim 1, wherein the polymer resin is a polyvinyl chloride resin.

3. The fly fishing line of claim 1, wherein the co-polymer of silicone comprises one of the following:

a. between 1% and 10% by weight of the coating;
b. between 1% and 8% by weight of the coating;
c. between 1% and 6% by weight of the coating; or
d. between 1% and 4% by weight of the coating.

4. The fly fishing line of claim 1, having a drag less than 2.5 n (9.0 oz-f).

5. The fly fishing line of claim 1, wherein the co-polymer of silicone is the fluorinated polydimethylsiloxane.

6. The fly fishing line of claim 5 wherein the fluorinated polydimethylsiloxane is:
between 1% and 4% by weight of the coating.

7. The fly fishing line of claim 1, wherein the co-polymer of silicone is a combination of the fluorinated polydimethylsiloxane or the fluorinated polydimethylsiloxane propylhydroxy copolymer and a crosslinked silicone.

8. The fly fishing line of claim 7, wherein the cross-linked silicone is a trimethoxysilane pre-polymer or a trimethoxysilane terminated polysiloxane.

9. The fly fishing line of claim 7, wherein the combination of the fluorinated polydimethylsiloxane or the fluorinated polydimethylsiloxane propylhydroxy copolymer and the crosslinked silicone comprise:
between 1% and 4% by weight of the coating.

10. The fly fishing line of claim 1, wherein an unmodified silicone fluid comprises at least 1% by weight of the coating.

11. The fly fishing line of claim 10, wherein the coating further comprises an acrylic monomer.

12. The fly fishing line of claim 11, wherein the acrylic monomer is trimethylol propane trimethacrylate, tetraethylene glycol diacrylate, 1,6 hexanediol dimethacrylate, or combinations of the foregoing.

13. The fly fishing line of claim 1, further comprising glass microspheres embedded in the outer coating.

14. The fly fishing line of claim 1, wherein the elongated core is a monofilament line.

15. The fly fishing line of claim 1, wherein the elongated core is a braided line.

16. A fly fishing line comprising:
an elongated core having at least one strand of monofilament; and
a coating disposed around the elongated core, wherein the coating comprises a polyvinyl chloride polymer, an unmodified silicone fluid, and a fluorinated silicone, wherein the fluorinated silicone is a fluorinated polydimethylsiloxane or a fluorinated polydimethylsiloxane propylhydroxy copolymer.

17. The fly fishing line of claim 16, wherein the fluorinated silicone comprises between 1% and 10% by weight of the coating.

18. The fly fishing line of claim 17, wherein the fluorinated silicone comprises between 1% and 4% by weight of the coating.

19. The fly fishing line of claim 16, wherein the unmodified silicone fluid comprises at least 1% by weight of the coating.

* * * * *